United States Patent [19]

Bandlish

[11] Patent Number: 4,847,319

[45] Date of Patent: Jul. 11, 1989

[54] SEALANT COMPOSITIONS OR COATING MIXTURES CONTAINING FUNCTIONAL SILANE OR SILOXANE ADHESION PROMOTORS NONREACTIVE WITH BLOCKED ISOCYANATES

[75] Inventor: Baldev K. Bandlish, Euclid, Ohio

[73] Assignee: The B. F. Goodrich Company, Akron, Ohio

[21] Appl. No.: 197,493

[22] Filed: May 23, 1988

[51] Int. Cl.$^4$ .............................................. C08L 75/00
[52] U.S. Cl. ................... 524/589; 524/188; 524/265; 524/266; 524/267; 524/268; 524/730; 524/731
[58] Field of Search ............... 524/188, 265, 266, 267, 524/268, 589, 730, 731

[56] References Cited

U.S. PATENT DOCUMENTS

| | | | |
|---|---|---|---|
| 2,942,019 | 6/1960 | Pike et al. | 260/448.2 |
| 3,248,371 | 4/1966 | Damusis | 260/77.5 |
| 3,267,078 | 8/1966 | Damusis | 260/77.5 |
| 3,627,722 | 12/1971 | Selter | 260/37 |
| 3,965,057 | 6/1976 | Ammons et al. | 524/730 |
| 4,067,844 | 1/1978 | Barron et al. | 260/37 |
| 4,222,925 | 9/1980 | Bryant et al. | 260/37 |
| 4,345,053 | 8/1982 | Rizk | 525/440 |
| 4,374,237 | 2/1983 | Berger | 528/28 |
| 4,507,443 | 3/1985 | Barron et al. | 525/453 |
| 4,539,345 | 9/1985 | Hansen | 524/265 |
| 4,625,012 | 11/1986 | Rizk | 528/28 |
| 4,687,533 | 8/1987 | Rizk | 156/307.3 |

FOREIGN PATENT DOCUMENTS 3414877 10/1985 Fed. Rep. of Germany .

*Primary Examiner*—Melvyn I. Marquis
*Attorney, Agent, or Firm*—James R. Lindsay; Daniel J. Hudak; Nestor W. Shust

[57] ABSTRACT

A sealant or coating composition admixture contains a blocked isocyanate-terminated prepolymer in which generally all of the NCO groups are blocked, a curing agent such as a polyamine or a polyimine, and a functional silane or siloxane nonreactive with blocked isocyanates. The sealants or coating compositions when cured have improved properties such as adhesion.

19 Claims, No Drawings

SEALANT COMPOSITIONS OR COATING MIXTURES CONTAINING FUNCTIONAL SILANE OR SILOXANE ADHESION PROMOTORS NONREACTIVE WITH BLOCKED ISOCYANATES

FIELD OF THE INVENTION

The present invention relates to a sealant or coating composition containing a blocked isocyanate-terminated prepolymer, a polyamine or polyimine curing agent, and small amounts of functional silane or siloxane adhesion promoters which are nonreactive with blocked isocyanates. The sealant or coating compositions of the present invention are essentially free of any organosilanes which are reactive with the blocked isocyanate-terminated prepolymer.

BACKGROUND

Sealant and coating compositions desirably have a combination of properties which render them particularly suitable for their intended applications. Such compositions should be able to be packaged in sealed containers or cartridges and stored for relatively long periods of time without objectionable "setting up" or hardening, that is curing of the components in the package. The one component sealant composition should form a relatively tack-free surface upon application and upon exposure to atmospheric moisture should cure without the formation of bubbles within a suitable time. The two component system can be formulated into package stable systems with adjustable cure rate and cured sealant properties. When cured, they should adhere tenaciously to a wide variety of surfaces such as glass, aluminum, concrete, marble, and steel. They should also have sufficient elasticity and flexibility to withstand contraction and expansion of panels, and the like, generally associated with temperature variations as a result of climatic changes and/or wind forces.

U.S. Pat. No. 4,067,844 to Barron et al relates to polyurethane polymers in which a proportion of the isocyanate-terminated prepolymers are reacted with certain aminosilanes, or with the reaction product of a mercaptosilane with a monoepoxide, or with the reaction product of an epoxysilane with a secondary amine.

U.S. Pat. No. 4,507,443 to Barron et al relates to a sealant or a coating composition containing a blocked isocyanate-terminated prepolymer in which generally all of the NCO groups are blocked, a multifunctional imine curing agent, and an organosilane which is reactive with the blocked isocyanate.

U.S. Pat. No. 2,942,019 to Pike et al relates to organosilicon methylideneamino compounds and a process for producing the same.

U.S. Pat. No. 3,248,371 to Damusis relates to low temperature deblocking agents which are alkylene oxide adducts of tertiary amines and hydroxy-terminated tertiary nitrogen-containing polyether-based urethane intermediates.

U.S. Pat. No. 3,267,078 to Damusis relates to polyether urethane coating compositions which are cured with diimine compounds.

U.S. Pat. No. 3,627,722 to Selter relates to urethane sealant compositions in which part of the NCO groups are end-blocked with $-Si(OR)_3$ groups where R is a lower alkyl.

U.S. Pat. No. 4,222,925 to Bryant et al relates to a sealant composition made from a polyurethane containing a small amount of N-beta aminoethyl, gamma-aminopropyltrimethoxysilane and a reinforcing filler such as carbon black.

U.S. Pat. No. 4,345,053 to Rizk et al relates to a moisture curable silicon terminated organic polymer made by reacting a polyurethane prepolymer having terminal active hydrogen atoms with an isocyanato organosilane having at least one hydrolyzable alkoxy group bonded to the silicon polymer.

U.S. Pat. No. 4,374,237 to Berger et al relates to curable isocyanate prepolymers wherein a portion or all of the available isocyanate terminal groups have been reacted with a secondary amine-containing silane monomer having two trialkoxysilane groups.

U.S. Pat. No. 4,625,012 to Rizk et al relates to methods of making moisture curable polyurethane polymers having terminal isocyanate groups and pendant alkoxysilane groups by reacting an isocyanatosilane adduct, having terminal isocyanate groups and at least one hydrolyzable alkoxy group bonded to a silicon, with a polyisocyanate and a polyol.

U.S. Pat. No. 4,687,533 to Rizk et al relates to a method for bonding a material to a non-porous substrate such as glass utilizing a moisture curable sealant composition containing a filler and a polyurethane polymer having terminal isocyanate groups and pendant silane groups having at least one alkoxy group bonded to silicon.

German Pat. No. 3,414,877 to Emmerling et al relates to moisture hardening polyurethane preparations containing adhesive agents such as aldimine or ketimine group containing alkylalkoxysilanes.

SUMMARY OF THE INVENTION

According to the concepts of the present invention, improved physical properties such as improved adhesion and improved joint movement capabilities, are achieved when specific types of silanes or siloxanes which are non-reactive with blocked isocyanate groups are utilized. That is, blocked urethane sealants and coatings of the present invention can contain blends of specific types of adhesion promoters which are non-reactive with the blocked isocyanate-terminated groups of the prepolymer. Accordingly, the present invention specifically excludes organosilanes which are reactive with blocked isocyanate-terminated prepolymers. Specific types of functional silanes or siloxanes which are not reactive with blocked isocyanates include epoxysilanes or epoxysiloxanes, isocyanatosilanes or isocyanatosiloxanes and ketiminosilanes or ketiminosiloxanes. The amount of such functional silane or siloxane compounds is generally small, as for example from about 0.1 part to about 10 parts by weight, desirably from about 0.2 to about 1.0 part by weight for every 100 parts by weight of the blocked prepolymer. When sealant compositions are made, a preferred range is from about 0.3 to about 0.7 parts by weight for every 100 parts by weight of the blocked prepolymer.

Sealants or coating compositions of the present invention can be moisture curable and form compositions that adhere tenaciously to a wide variety of surfaces and form tack-free surfaces after being exposed to the atmosphere for only a short period of time. When a two-part system is utilized, mixture of the two separate components forms a cured sealant within a matter of hours after application.

DETAILED DESCRIPTION OF THE INVENTION

The present invention relates to a urethane sealant composition or coating admixture comprising a blend of a blocked isocyanate-terminated prepolymer and an adhesion promoter which is non-reactive therewith. Moreover, the present invention relates to such a urethane sealant composition or coating admixture which is essentially or desirably free of any organosilane compounds which are reactive with the blocked isocyanate-terminated prepolymer. The blends of the present invention when a one-part system desirably contain a polyimine curing agent and when a two-part system generally contain a polyamine curng agent. The blends can also contain various conventional additives and the like and upon cure yield a sealant or coating having improved physical properties and especially improved adhesion properties.

Considering the urethane prepolymers, the urethane prepolymers of the present invention are generally made from a polyisocyanate and any conventional intermediate utilized in the preparation of urethane sealants or coatings. Thus, the intermediate can be a polyether polyol, a polyester polyol, and the like wherein the polyol is a diol or a triol. Such urethane intermediates are well known to the art and to the literature. Specific examples include polyethylene ether diols or triols, polypropylene ether diols or triols, polybutylene ether diols or triols, polytetramethylene ether diols or triols, and block copolymers of such diols and triols, and/or blends thereof. Specific examples of hydroxyl-terminated polyesters include any hydroxy-terminated polyester prepared from poly-basic acids or anhydrides as for example adipic acid and phthalic anhydride, and polyols in which the hydroxyl functionality of the polyester prepolymer is greater than 2, and preferably greater than 2.3. The intermediates generally have a molecular weight of from about 1,000 to about 25,000.

The prepolymers of the present invention are made by reacting the above-noted polyol intermediates with a polyisocyanate generally having the formula $R(NCO)_n$ wherein n is 2, 3 or 4 and R is an aliphatic, an aromatic, or an aliphatic substituted aromatic having from 4 to 20 carbon atoms and preferably from 6 to 15 carbon atoms. Desirably the aliphatic groups are alkyl groups. Examples of specific di- or triisocyanates which can be utilized include p,p',p''-triisocyanato triphenyl methane, p,p'-diisocyanato diphenyl methane (MDI), hexamethylene diisocyanate, naphthalene-1,5-diisocyanate, and various isomers of toluene diisocyanates (TDI) such as 2,4-tolylene diisocyanate, 2,6-tolylene diisocyanate, and mixtures thereof. MDI and TDI are preferred. Inasmuch as an adhesive type composition is desired, the equivalent weight ratio of the polyisocyanate to the polyol intermediate, that is, the NCO/OH ratio is from about 1.8 to about 2.2 and preferably from about 2.0 to about 2.1. The formation of the prepolymer while occurring at ambient temperature is generally conducted at higher temperatures to reduce the reaction time, as from between 40° to about 125° C. with from about 60° C. to about 100° C. being preferred.

In order to provide a prepolymer that is more stable during storage, the isocyanate-terminated prepolymer described above is substantially "blocked" with a blocking agent that reacts with the terminal isocyanate groups of the prepolymer. Blocking agents useful in the present invention include any conventional blocking agents as well as those known to the art and to the literature that produce blocked terminal isocyanates that do not readily react with moisture in air at room temperature (about 25° C.). However, upon exposure of the curing agents to moisture, they will "unblock" the isocyanate and react with the same. General types of blocking agents include various phenol type compounds, various oxime compounds, various ester compounds, and the like. Examples of suitable blocking agents include phenol, 3-methoxyphenol, 4-methoxyphenol, nonylphenol, meta-cresol, paracresol, 4-chlorophenol, meta-hydroxybenzaldehyde, ortho-hydroxybenzaldehyde, parahydroxybenzaldehyde, hydroquinone, 1-hydroxy-2-propanone, 3-hydroxyacetophenone, 4-hydroxyacetophenone, ethyl acetyl acetate and cyclohexanone oxime. A sufficient amount of the blocking agent is utilized to react with the isocyanate prepolymers to substantially "block" the terminal isocyanate groups and preferably to block all of the terminal isocyanate groups. The amount of blocking agent utilized is such that the equivalent weight ratio of the blocking agent to the terminal isocyanate groups is at least 0.85 and can be a large excess since it often serves as a plasticizing agent.

The curing agents of the present invention include the various polyamide and the various polyimine compounds. The particular type of curing agent utilized generally depends upon whether a two part urethane sealant or coating system is utilized or a one part system. When a two part system is utilized, the curing agent is contained as a separate component or composition which is not mixed with the prepolymer component or composition until immediately prior to application of the sealant or coating composition. Generally, any conventional polyamine curing agent can be utilized including those known to the art and to the literature. An example of a typical polyamine curing agent is a diamine or a triamine represented by the formula

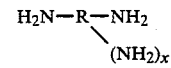

wherein R is an aliphatic, or an aliphatic substituted aromatic, with the aliphatic group being connected to the amine group having from 1 to 25 carbon atoms and preferably from 2 to 10 atoms, with x being 0 or 1, and preferably 0. Examples of specific amine compounds include ethylene diamine, butylene diamine, propylene diamine, decamethylene diamine, octamethylene diamine, and the like.

Another class of suitable polyamine compounds are the various amine terminated polyethers. These compounds are generally diamines or triamines containing polyether groups therein wherein the number of ether repeating units can vary as from 2 up to about 150. The molecular weight of the amine terminated polyethers is generally from about 200 to about 7000. Such compounds are produced by the Texaco Chemical Co. under the brand name Jeffamine such as the M series, the D series, the ED series, the DU series, the BuD series, and the Jeffamine T series. Such amine terminated polyethers are described in the bulletin, "The Jeffamine Polyoxyalkyleneamines", by the Texaco Chemical Co., Copyright 1985, NPD-024 1020745, which is hereby fully incorporated by reference. A particularly preferred compound is the Jeffamine D compounds which have the following formula:

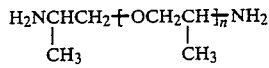

wherein n is from 2 to about 100 and preferably from about 4 to about 20.

Still another class of suitable polyamine compounds are the polyamine polyamines made from polyamines and dicarboxylic acids having from 2 to 36 carbon atoms such as oxalic acid, malonic acid, succinic acid, adipic acid, suberic acid, azelalic acid, dimerized fatty acids, trimerized fatty acids, and the like.

When a one part system is utilized, that is a composition in which all of the components of the polyurethane sealant or coating are contained together, a polyimine curing agent is generally utilized. The polyimines will not react with the blocked isocyanate-terminated prepolymer unless exposed to moisture as upon application of the sealant. Various polyimines can be prepared by reacting any of the above polyamine compounds with either a ketone or an aldehyde as well known to those skilled in the art and to the literature. The end result is the production of various ketimine compounds or aldimine compounds. Examples of specific ketimine type compounds which can be utilized are set forth in U.S. Pat. No. 4,507,443 which is hereby fully incorporated by reference.

Regardless of whether a one part or two part system is utilized, the amount of the polyamine or polyimine curing agent is from about 0.6 to about 1.5 weight equivalents and preferably 0.8 to 1.2 weight equivalents per equivalent of a blocked isocyanate.

When a two component system is utilized, as noted above, one of the components contains the prepolymer and the second component contains the curing agent. The curing agent component generally contains the amine curing agent, and various additives in conventional amounts, if desired, such as various plasticizers, pigments, thickeners, drying agents, and the like. The prepolymer or base component contains various conventional additives or compounding ingredients such as fillers, thixotropic agents, extenders, pigments, plasticizers, UV absorbers, solvents, and the like. Typically, the prepolymer component contains large amounts of a filler such as talc, various types of silicates, various types of clays, calcium carbonate, and the like, in an amount of from about 60 to about 200 parts by weight per 100 parts by weight of the prepolymer; a thickening agent such as a thixotropic compound in an amount of from 0 to about 30 parts by weight per 100 parts by weight of the prepolymer; UV absorbers in an amount of usually less than 1 or 2 parts by weight per 100 parts by weight of the prepolymer; and plasticizers in an amount of from about 0 to about 50 parts by weight per 100 parts by weight of the prepolymer. Solvents, which are generally utilized to adjust the viscosity of the prepolymer or base component to a desired range, constitute generally less than 10 percent volatility of the total prepolymer component for sealant compositions. In coating compositions, the amount of solvent is generally higher.

The present invention is the utilization of certain types of adhesion promoters which are non-reactive with the blocked isocyanate-terminated prepolymers. That is unlike U.S. Pat. No. 4,507,443, the adhesion promotors of the present invention are specific functional organic silane or functional organic siloxane compounds which do not react with the blocked isocyanate prepolymers. Accordingly, the sealant compositions and coating admixtures of the present invention are essentially free from, exclude, or do not contain organosilane compounds which react with the blocked isocyanate-terminated prepolymers. Such isocyanate reactive organosilane compounds are not within the ambit of the present invention inasmuch as their reaction has found to degrade mechanical properties such as movement capability. It has been found, however, that the use of an epoxysilane or an epoxysiloxane, an isocyantosilane, or an isocyantosiloxane, or a ketiminosilane or a ketiminosiloxane improves various physical mechanical properties such as elongation, modulus, movement capability, as well as adhesion.

The various functional silane compounds of the present invention which are nonreactive with blocked isocyanates can generally be represented by the formula

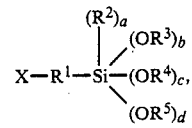

or a siloxane derivative thereof, where X is a functional group such as an epoxy group, an isocyanate, or a ketimine. $R^1$ is an intermediate or linking hydrocarbon group such as an aliphatic, desirably an alkyl, having from 1 to 16 carbon atoms with from 2 to 6 carbon atoms being preferred. A preferred $R^1$ group is propyl. $R^1$ can also be a cycloaliphatic such as a cyclo alkyl having from 4 to 8 carbon atoms. A less desired $R^1$ group is an aromatic or an alkyl substituted aromatic having from 6 to 15 carbon atoms. The $R^2$ group is an aliphatic, such as an alkyl, having from 1 to 25 carbon atoms or less desirably an aromatic or an alkyl substituted aromatic having from 6 to 15 carbon atoms. The number of such "a" groups is 0, 1, or 2. Each alkoxy group, independently, is 0 or 1, that is "b", "c", and "d" is 0 or 1, with the proviso that "a"+"b"+"c"+"d"=3. $R^3$, $R^4$, and $R^5$, independently is an alkyl having from 1 to 10 carbon atoms, with 1 to 4 carbon atoms being preferred, or an aromatic or an alkyl substituted aromatic having from 6 to 12 carbon atoms. Preferably all three alkoxy groups exist with said groups being methoxy. Thus, trimethoxysilyl is a highly preferred silane group.

The various X groups, as noted, can be an epoxy group, an isocyanato group, or a ketimino group. Numerous epoxy groups can exist. For example, the epoxy group can be an epoxy group per se (i.e., ethylene oxide), glycidoxy—a preferred group, 2-alkylglycidoxy wherein the alkyl group has from 1 to 4 carbon atoms with methyl being desired, an epoxycycloalkylene group wherein the alkylene group has from 4 to 10 carbon atoms with epoxycyclohexyl being desired. Inasmuch as the specific epoxy group of glycidoxy is preferred, a preferred epoxysilane of the above formula is gamma-glycidoxypropyltrimethoxysilane.

With regard to X being an isocyanate group, it is precisely that, that is an NCO group. A preferred isocyanatosilane is isocyanatopropyltrimethoxysilane.

Considering the ketiminosilanes, the X portion has the formula

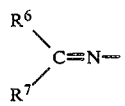

where $R^6$ and $R^7$, independently, is an aliphatic and desirably an alkyl having from 1 to 10 carbon atoms and preferably from 1 to 4 carbon atoms, less desirably an aromatic or an alkyl substituted aromatic having from 6 to 15 carbon atoms, or is hydrogen. A preferred ketiminosilane is the methylisobutylketone based ketimine of gamma-aminopropyltrimethoxysilane.

The epoxysiloxanes, the isocyanatesiloxanes, and the ketiminosiloxanes, are merely siloxane oligomers of the above-noted epoxysilanes, isocyanatosilanes or ketiminosilanes. The oligomers can be a dimer, trimer, etc. and can be defined as having 2 to about 50 repeating units of the silicon atom.

Utilizing the specific functional silane or siloxane compounds of the present invention which are nonreactive with blocked isocyanates, it has been found that better physical properties are obtained as set forth hereinafter. In contrast, the different organosilanes previously utilized which reacted with free isocyanate groups as well as with blocked isocyanate groups did not yield the improved properties of the present invention.

Urethane sealants of the present invention can be utilized as caulking compounds for windows, panels, concrete, masonry, stone, and the like. When utilized as a protective coating composition, a solvent material such as toluene, benzene, xylene, hexane, heptane, and the like, is generally added to provide a coating composition having a consistency suitable for application as by spraying, brushing, roll coating, and the like.

The invention will be better understood by reference to the following examples.

EXAMPLE 1

(Control)

A blocked isocyanate-terminated polymer was formed according to the following procedure.

About 2000 parts by weight of a polyol consisting of a copolymer of propyleneoxide with ethyleneoxide having an hydroxyl number of 26 was admixed with 556 parts by weight of toluene and azeotroped to remove 356 parts by weight of toluene. After cooling under nitrogen atmosphere, 166 parts by weight of an 80/20 weight percent mixture of 2,4-tolylene diisocyanate and 2,6-tolylene diisocyanate were added at room temperature. The resulting mixture was heated to 90° C. and held at that temperature for three hours to form the isocyanate terminated prepolymer. About 209 parts by weight of nonylphenol then were added to the reaction mixture and the mixture was maintained at 90° C. for one hour. About 0.2 parts by weight of stannous octoate (a catalyst for promoting blocking of the isocyanate terminated polymer) was added to the mixture and the mixture was maintained at 90° C. for an additional two hours. The resulting blocked isocyanate terminated prepolymer was formulated according to the following recipe.

Blocked isocyanate terminated polymer described above: 100 parts
Thixcin R, a Thixotrope, made by NL Industries: 15 parts
Benzoflex, 9-88, a plasticizer made by Monsanto: 26 parts
Calcium carbonate: 60 parts
Paraffin wax: 2.2 parts
Process oil: 4.4 parts
A ketimine prepared from Jeffamine D-400, and methylisobutylketone: 10.7 parts Samples prepared from above formulation were cured for one week at room temperature, one week at 120° F., and one week at 158° F. Physical properties of the cured sample are given in Table I and are used as the control for Examples 2, 3 and 4.

EXAMPLE 2

A prepolymer described in Example 1 was formulated according to the following recipe.

Blocked isocyanate-based polymer: 100 parts
Thixcin-R: 15 parts
Benzoflex 9-88: 26 parts
Calcium Carbonate: 60 parts
Paraffin wax: 2.2 parts
Process Oil: 4.4 parts
Ketimine from Jeffamine D-400 and Methyl isobutyl ketone: 10.9 parts
Gamma-glycidoxypropyltrimethoxysilane: 0.2 parts Samples prepared according to the above formulation were cured for one week at room temperature, one week at 120° F., and for one week at 158° F. Physical properties and the adhesion data of the cured samples is given in Table I. Data in Table I clearly shows that addition of epoxysilanes such as gamma-glycidoxypropyltrimethoxysilane in small concentration significantly improves the adhesion without effecting the physical properties.

EXAMPLE 3

100 parts of methylisobutylketone were azeotroped and 52 parts by weight of methylisobutylketone were removed to dry the methylisobutylketone. To the remaining methylisobutylketone, 45 parts by weight of gamma-aminopropyltrimethoxysilane is added at room temperature. The above reaction was stirred at room temperature for 30 minutes and then heated to 60° C. and held at that temperature for 4.5 hours. Excess methylisobutylketone and methanol was then removed by distillation. A ketiminosiloxane, so prepared is used in the following formulation.

Blocked isocyanate-based polymer: 100 parts
Thixcin R: 15 parts
Benzoflex: 26 parts
Calcium carbonate: 60 parts
Paraffin wax: 2.2 parts
Process Oil: 4.4 parts
Ketimine from Jeffamine D-400 and Methylisobutyl ketone: 10.5 parts
Ketiminosiloxane prepared as set forth above: 0.2 parts Samples prepared according to the above formulation were cured according to the procedure given in Example 1. Physical properties and the adhesion data for the cured samples are given in Table I. Data in Table I clearly shows that addition of a small amount of ketiminosiloxane improved the adhesion without significantly effecting physical properties.

EXAMPLE 4

A prepolymer described in Example 1 was formulated according to the following recipe.

Blocked isocyanate-based prepolymer: 100 parts
Thixcin R: 15 parts
Benzoflex: 26 parts
Calcium carbonate: 60 parts
Paraffin wax: 2.2 parts
Process Oil: 4.4 parts
Ketimine from Jeffamine D-400 and Methylisobutyl ketone: 10.5 parts
Isocyanatopropyltrimethoxysilane: 0.3 parts Samples prepared from the above formulation were cured according to the procedure given in Example 1.

EXAMPLE 5

A blocked isocyanate-based prepolymer was prepared using 3000 grams of polyol consisting of a copolymer of propyleneoxide with ethyleneoxide, 150 grams toluene, 259.8 grams of an 80/20 weight percent mixture of 2,4-tolylenediisocyanate and 2,6-tolydiisocyanate, and 344 grams of nonylphenol according to a procedure similar to the one described in Example 1.

A prepolymer so prepared was formulated according to formulation given in Table II.

TABLE II

|  | Control | 5A | 5B | 5C | 5D |
|---|---|---|---|---|---|
| Prepolymer (g) | 100 | 100 | 100 | 100 | 100 |
| Thixcin R (g) | 15 | 15 | 15 | 15 | 15 |
| Benzoflex (g) | 26 | 26 | 26 | 26 | 26 |
| Calcium carbonate | 60 | 60 | 60 | 60 | 60 |
| Paraffin wax (g) | 2.2 | 2.2 | 2.2 | 2.2 | 2.2 |
| Process oil (g) | 4.4 | 4.4 | 4.4 | 4.4 | 4.4 |
| MTMS (g) | 0 | 1.2 | 1.2 | 1.2 | 1.2 |
| Ketimine (see Note 1) (g) | 10.7 | 10.87 | 10.87 | 10.87 | 10.87 |
| Gamma-glycidoxypropyl-trimethyoxypropylsilane | 0 | 0.4 | 0.5 | 0.6 | 0.7 |
| Elongation, % | 983 | 944 | 835 | 949 | 901 |
| 100% Modulus, psi | 68 | 72 | 73 | 71 | 64 |
| Tensile Strength, psi | 196 | 156 | 158 | 164 | 165 |
| Dry Adhesion |  |  |  |  |  |
| Glass | 100% ADH 10.1 pli | 100% COH 64.5 pli | 100% COH 62.0 pli | 100% COH 61.5 pli | 100% COH 49.3 pli |
| Anodized Aluminum | 100% ADH 5.6 pli | 100% COH 58.3 pli | 100% COH 48.5 pli | 100% COH 41.0 pli | 100% COH 50.7 pli |
| Milled Aluminum | 100 ADH 2.3 pli | 100% COH 64.5 pli | 100% COH 53.1 pli | 100% COH 50.8 pli | 100% COH 55.1 pli |
| Concrete | — — | 100% ADH 45.0 pli | 100% ADH 43.5 pli | 100% ADH 41.7 pli | 100% ADH 39.6 pli |
| Adhesion after Water Immersion (see Note 2) |  |  |  |  |  |
| Glass | — | 100% COH 37.6 pli | 100% COH 54.7 pli | 100% COH 29.4 pli | 100% COH 46.7 pli |
| Anodized Aluminum | — | 100% COH 61.0 pli | 100% COH 36.7 pli | 100% COH 45.8 pli | 100% COH 35.3 pli |
| Milled Aluminum | — | 100% COH 35.0 pli | 100% COH 60.5 pli | 100% COH 41.9 pli | 100% COH 43.6 pli |
| Concrete | — | 100% ADH 30.5 pli | 100% ADH 24.7 pli | 100% ADH 31.3 pli | 100% ADH 25.0 pli |

1. The ketimine was prepared by reacting Jeffamine D-400 with methyl isobutyl ketone. The procedure for preparing this ketimine is disclosed in U.S. Pat. No. 4,507,443.
2. Since the adhesion before immersion was adhesive in nature, it was not tested after water immersion.

Physical properties and the adhesion data for the cured samples is given in Table I. Data in Table I clearly shows that addition of a small amount of isocyanatosilanes improves both adhesion as well as physical properties of the cured sample.

Data in Examples 2 through 5 clearly shows that the mechanical properties are not effected significantly when the epoxysilane level was varied from 0.2 parts to 0.7 parts per 100 grams of the polymer. This data further shows that adequate adhesion is obtained with 0.4 or more parts of the epoxysilane per 100 grams of prepolymer.

TABLE I

|  | Example 1 (Control) | Example 2 (Epoxysilane) | Example 3 (Ketiminosilane) | Example 4 (Isocyanatosilane) |
|---|---|---|---|---|
| Elongation % | 983 | 975 | 887 | 1350 |
| 100% Modulus, psi | 68 | 67 | 87 | 66 |
| Tensile strength, psi | 196 | 160 | 258 | 268 |
| Dry Adhesion |  |  |  |  |
| Glass | 100% ADH 10.1 pli | 100% COH 57.4 pli | 100% COH 50.0 pli | 100% COH 49.2 pli |
| Anodized Aluminum | 100% ADH 5.6 pli | 100% COH 49.7 pli | 100% ADH 40.2 pli | 100% ADH 45.0 pli |
| Milled Aluminum | 100% ADH 2.3 pli | 100% ADH 9.6 pli | 100% ADH 8.2 pli | 100% ADH 7.6 pli |

Notes:
COH represents cohesive nature of sealant failure
ADH represents adhesive nature of sealant failure
pli represents pounds per linear inch
psi represents pounds per square inch

EXAMPLE 6

A blocked isocyanate terminated polymer was formed according to the following procedure.

About 181.9 pounds of a polyol consisting of a copolymer of propyleneoxide with ethyleneoxide with an hydroxyl number of 26.7 was admixed with 18.75 pounds of toluene. To this mixture, 15.82 pounds of an 80/20 weight percent mixture of 2,4-tolylene diisocyanate and 2,6-tolylene diisocyanate were added at room temperature. The resulting mixture was heated to 85° C. and held at that temperature for two hours. Nonylphenol in an amount of 20.9 pounds was then added to the mixture and the mixture was maintained for one hour at 85° C. About 6.2 grams of stannous octoate were added to the mixture and the mixture was maintained for two hours and fifteen minutes. The resulting reaction product was a blocked isocyanate terminated prepolymer. This prepolymer was used in Examples 6, 7, and 8. Recipe and the sealant evaluation is given in Table III.

TABLE III

| | EXAMPLE 6 | EXAMPLE 7 | EXAMPLE 8 |
|---|---|---|---|
| Polymer | 200 | 200 | 200 |
| Thixcin R | 30 | 30 | 30 |
| Benzoflex 9-88 | 52 | 52 | 52 |
| Calcium Carbonate | 120 | 120 | 120 |
| Paraffin Wax | 4.5 | 4.5 | 4.5 |
| Process Oil | 8.9 | 8.9 | 8.9 |
| Ketimine prepared from Jeffamine D-400 and Methylisobutyl ketone | 17.2 | 17.2 | 17.2 |
| Gamma-Aminopropyltrimethoxysilane | 0.6 | 0.0 | 0.0 |
| Ketiminosiloxane (see Example 3) | 0.0 | 0.6 | 0.0 |
| Gamma-Glycidoxypropyltrimethoxysilane | 0.0 | 0.0 | 0.6 |
| Elongation, % | 700 | 900 | 1100 |
| 100% Modulus, psi | 94 | 82 | 75 |
| Tensile strength, psi | 153 | 144 | 121 |
| Adhesion (See Note 1) | | | |
| Concrete, pli | 53.1 | 51.2 | 23.8 |
| Glass, pli | 42.3 | 51.5 | 36.1 |
| Anodized Aluminum, pli | 47.7 | 59.5 | 46.6 |
| Milled Aluminum, pli | 42.3 | 41.5 | 44.6 |

Note
1. Nature of adhesion was cohesive in all these samples.

The data in Examples 6, 7 and 8 show that the use of three different types of nonreactive silanes produce good adhesion results.

While in accordance with the Patent Statutes, the best mode and preferred embodiment has been set forth, the scope of the invention is not limited thereto, but rather by the scope of the attached claims.

What is claimed is:

1. A sealant composition or coating admixture, comprising:
a blend of a blocked isocyanate prepolymer, a functional silane or siloxane adhesion promoter non-reactive with said blocked isocyanate-terminated prepolymer, and an effective amount of a polyimine curing agent or a separate polyamine curing agent capable of curing the sealant composition or the coating admixture, said blend being substantially free of organosilanes which are reactive with said blocked isocyanate prepolymer, said blocked isocyanate prepolymer being made from a polyisocyanate and an intermediate which is subsequently blocked with a blocking agent, wherein said intermediate is a polyether polyol, or a polyester polyol, the amount of said functional silane or siloxane adhesion promoter being from about 0.1 to about 10 parts by weight based upon 100 parts by weight of said prepolymer, and wherein said functional silane adhesion promoter non-reactive with said blocked isocyanate-terminated prepolymer has the formula

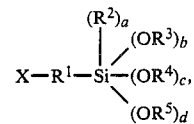

or a siloxane derivative thereof,
wherein $R^1$ is an aliphatic having from 1 to 16 carbon atoms, a cycloaliphatic having from 4 to 8 carbon atoms, or an aromatic or an alkyl substituted aromatic having from 6 to 15 carbon atoms, wherein $R^2$ is an aliphatic having from 1 to 25 carbon atoms, or an aromatic or an alkyl substituted aromatic having from 6 to 15 carbon atoms, wherein $R^3$, $R^4$, and $R^5$, independently, is an alkyl having from 1 to 10 carbon atoms, an aromatic or an alkyl substituted aromatic having from 6 to 12 carbon atoms, wherein "a" is 0, 1, or 2, wherein "b", "c", and "d", independently, is 0 or 1, wherein "a"+"b"+"c"+"d"=3, and wherein X is an epoxy group, an isocyanato group, or a ketimine group.

2. A sealing composition or coating admixture according to claim 1, wherein X is an epoxy group, wherein said epoxy group is epoxy, glycidoxy, 2-alkylglycidoxy wherein said alkyl group has from 1 to 4 carbon atoms, or an epoxycycloalkylene wherein said alkylene has from 4 to 10 carbon atoms.

3. A sealing composition or coating admixture according to claim 2, wherein $R^2$ is an alkyl having from 2 to 6 carbon atoms, or a cycloalkyl having from 4 to 8 carbon atoms, wherein $R^2$ is an alkyl having from 1 to 25 carbon atoms, and wherein $R^3$, $R^4$, and $R^5$, independently, is an alkyl having from 1 to 4 carbon atoms.

4. A sealing composition or coating admixture according to claim 3, wherein said epoxysilane adhesion promoter is glycidoxypropyltrimethoxysilane.

5. A sealing composition or coating admixture according to claim 2, wherein said adhesion promoter is a siloxane derivative of the compositions of claim 3 and has from 2 to 50 repeating groups therein.

6. A sealing composition or coating admixture according to claim 4, wherein said adhesion promoter is a siloxane oligomer of glycidoxypropyltrimethoxysilane having from 2 to 50 siloxane repeating units.

7. A sealing composition or coating admixture according to claim 1, wherein X is an isocyanato group, wherein $R^1$ is an alkyl having from 2 to 6 carbon atoms, or a cycloalkyl having from 4 to 8 carbon atoms, wherein $R^2$ is an alkyl having from 1 to 25 carbon atoms, wherein $R^3$, $R^4$, and $R^5$, independently is an alkyl having from 1 to 4 carbon atoms.

8. A sealing composition or coating admixture according to claim 7, wherein said adhesion promoter is isocyanatopropyltrimethoxysilane.

9. A sealing composition or coating admixture according to claim 7, wherein said adhesion promoter is a siloxane derivative of said isocyanato compound and has from 2 to 50 siloxane repeating units therein.

10. A sealing composition or coating admixture according to claim 8, wherein said adhesion promoter is a siloxane derivative of said isocyanatopropyltrimethoxysilane and has from 2 to 50 siloxane repeating units therein.

11. A sealing composition or coating admixture according to claim 1, wherein X is a ketimine group, wherein said ketimine group has the formula

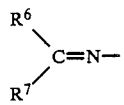

wherein $R^6$ and $R^7$, independently, is an aliphatic having from 1 to 10 carbon atoms, an aromatic or an alkyl substituted aromatic having from 6 to 15 carbon atoms, or hydrogen.

12. A sealing composition or coating admixture according to claim 11, wherein $R^1$ is an alkyl having from 2 to 6 carbon atoms, or a cycloalkyl having from 4 to 8 carbon atoms, wherein $R^2$ is an alkyl having from 1 to 25 carbon atoms, wherein $R^3$, $R^4$, and $R^5$, independently, is an alkyl having from 1 to 4 carbon atoms.

13. A sealing composition or coating admixture according to claim 12, wherein said adhesion promoter is the methylisobutylketone ketimine of gamma-aminopropyltrimethoxysilane.

14. A sealing composition or coating admixture according to claim 12, wherein said adhesion promoter is a siloxane derivative of said ketimine and has from 2 to about 50 siloxane repeating units therein.

15. A sealing composition or coating admixture according to claim 13, wherein said adhesion promoter is a siloxane of said ketimine and has from 2 to 50 siloxane repeating units therein.

16. A sealing composition or coating admixture according to claim 1, wherein said sealing composition or coating admixture is cured.

17. A sealing composition or coating admixture according to claim 3, wherein said sealing composition or coating admixture is cured.

18. A sealing composition or coating admixture according to claim 7, wherein said sealing composition or coating admixture is cured.

19. A sealing composition or coating admixture according to claim 12, wherein said sealing composition or coating admixture is cured.

* * * * *